United States Patent
Ma et al.

(10) Patent No.: US 12,120,733 B2
(45) Date of Patent: *Oct. 15, 2024

(54) COMMUNICATION APPARATUS AND COMMUNICATION METHOD FOR CONTROLLING CHANNEL ACCESS OPERATION

(71) Applicant: Sony Group Corporation, Tokyo (JP)

(72) Inventors: Yuelin Ma, Kanagawa (JP); Shigeru Sugaya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,866

(22) Filed: Oct. 23, 2023

(65) Prior Publication Data

US 2024/0057151 A1     Feb. 15, 2024

Related U.S. Application Data

(63) Continuation of application No. 17/680,302, filed on Feb. 25, 2022, now Pat. No. 11,832,301, which is a (Continued)

(30) Foreign Application Priority Data

Oct. 31, 2016 (JP) ................................. 2016-212506

(51) Int. Cl.
*H04W 74/04* (2009.01)
*H04B 7/0452* (2017.01)

(52) U.S. Cl.
CPC .......... *H04W 74/04* (2013.01); *H04B 7/0452* (2013.01)

(58) Field of Classification Search
CPC ... H04W 74/04; H04W 84/12; H04W 74/006; H04B 7/0452
See application file for complete search history.

(56) References Cited

U.S. PATENT DOCUMENTS

| | | |
|---|---|---|
| 2005/0047357 A1 | 3/2005 | Benveniste |
| 2006/0045059 A1 | 3/2006 | Yun et al. |

(Continued)

FOREIGN PATENT DOCUMENTS

| | | |
|---|---|---|
| JP | 2004-363702 A | 12/2004 |
| JP | 2006-054595 A | 2/2006 |

(Continued)

OTHER PUBLICATIONS

International Search Report mailed on Oct. 31, 2017 for PCT/JP2017/029482 filed on Aug. 16, 2017, 14 pages including English Translation.

(Continued)

*Primary Examiner* — Tejis Daya
(74) *Attorney, Agent, or Firm* — XSENSUS LLP

(57) ABSTRACT

To provide a communication apparatus which controls channel access operation under a multi user environment, and a communication method.
Channel access operation of each STA after an MU mode is finished is controlled through a trigger frame from an AP to prevent collision immediately after the MU mode is finished. Further, the AP sets a smaller CW upon transmission of the trigger frame than a CW of an STA to preferentially transmit the trigger frame and give priority to communication in the MU mode over communication in an SU mode. Further, by the CW of each STA upon switching of the mode being not reset, a transmission waiting period after the MU mode is finished is shortened.

12 Claims, 14 Drawing Sheets

Related U.S. Application Data continuation of application No. 16/336,907, filed as application No. PCT/JP2017/029482 on Aug. 16, 2017, now Pat. No. 11,291,043.

(56) References Cited

U.S. PATENT DOCUMENTS

| | | |
|---|---|---|
| 2009/0213815 A1 | 8/2009 | Sherman et al. |
| 2011/0044303 A1 | 2/2011 | Ji et al. |
| 2011/0149723 A1 | 6/2011 | Gong et al. |
| 2011/0176627 A1 | 7/2011 | Wu et al. |
| 2011/0243025 A1 | 10/2011 | Kim et al. |
| 2011/0274040 A1 | 11/2011 | Pani et al. |
| 2013/0058222 A1 | 3/2013 | Ben-Yehezkel et al. |
| 2013/0176986 A1 | 7/2013 | Yu et al. |
| 2014/0177616 A1 | 6/2014 | Seok |
| 2014/0307653 A1 | 10/2014 | Liu et al. |
| 2015/0071051 A1 | 3/2015 | Zhu et al. |
| 2015/0124723 A1 | 5/2015 | Namba |
| 2015/0139209 A1 | 5/2015 | Park et al. |
| 2016/0067611 A1 | 3/2016 | Ware et al. |
| 2016/0088567 A1* | 3/2016 | HomChaudhuri ............ H04W 52/0274 370/252 |
| 2016/0198500 A1 | 7/2016 | Merlin et al. |
| 2016/0226635 A1 | 8/2016 | Chu et al. |
| 2016/0295509 A1* | 10/2016 | Saed ................ H04W 52/0225 |
| 2016/0316458 A1 | 10/2016 | Kwon |
| 2016/0316472 A1 | 10/2016 | Kwon |
| 2016/0345362 A1 | 11/2016 | Lee et al. |
| 2017/0127447 A1 | 5/2017 | Huang et al. |
| 2017/0171886 A1 | 6/2017 | Nabetani et al. |
| 2017/0303292 A1 | 10/2017 | Ahn |
| 2017/0325266 A1* | 11/2017 | Kim ................ H04W 72/0446 |
| 2018/0014334 A1 | 1/2018 | Ahn |
| 2018/0110069 A1* | 4/2018 | Zhou ................ H04W 74/0875 |
| 2019/0289577 A1 | 9/2019 | Madhavan et al. |

FOREIGN PATENT DOCUMENTS

| | | |
|---|---|---|
| JP | 5437307 B2 | 3/2014 |
| RU | 2569569 C2 | 11/2015 |
| RU | 2574600 C1 | 2/2016 |
| WO | 2016/108672 A1 | 7/2016 |
| WO | 2016/129979 A1 | 8/2016 |

OTHER PUBLICATIONS

Extended Search Report issued in European Application 17866095.7-1215 dated Sep. 13, 2019.

Office Action issued Jul. 23, 2020 in Russian Patent Application No. 2019112319/07(023946), 14 pages.

* cited by examiner

COMMUNICATION APPARATUS AND COMMUNICATION METHOD FOR CONTROLLING CHANNEL ACCESS OPERATION

CROSS-REFERENCE TO RELATED APPLICATIONS

This application is a continuation of U.S. application Ser. No. 17/680,302, filed Feb. 25, 2022, which is a continuation of U.S. application Ser. No. 16/336,907, filed Mar. 27, 2019 (Now U.S. patent Ser. No. 11/291,043), which is based on PCT filing PCT/JP2017/029482, filed Aug. 16, 2017, which claims priority to JP 2016-212506 filed Oct. 31, 2016, the entire contents of each are incorporated herein by reference.

TECHNICAL FIELD

The technology disclosed in the present specification relates to a communication apparatus which controls channel access operation under a multi user environment, and a communication method.

BACKGROUND ART

In a wireless LAN typified by IEEE 802.11, or the like, increase of communication speed can be realized by orthogonal frequency division multiple access (OFDMA) and multi user multi-input multi-output (MU-MIMO) being introduced (see, for example, Patent Literature 1).

Here, in OFDM, which is a multi-carrier scheme in which a plurality of pieces of data is allocated to frequency subcarriers which are "orthogonal", that is, which do not interfere with each other, each subcarrier on a frequency axis can be converted into a signal on a time axis and transmitted by inverse fast Fourier transform (FFT) being performed on each subcarrier. OFDMA is a multiple access scheme in which, instead of one communication station occupying all subcarriers of an OFDM signal, subcarrier sets on the frequency axis are allocated to a plurality of communication stations, so that subcarriers are shared among the plurality of communication stations.

Further, MIMO is a communication scheme which realizes a spatial multiplexed stream by a plurality of antenna elements being provided at both a transmitter side and a receiver side. It can be said that MU-MIMO is a spatial division multiple access scheme in which wireless resources on a spatial axis are shared among a plurality of users.

Communication using OFDMA or MU-MIMO is called a multi user (MU) mode. In contrast to this, one-to-one communication without multiple access is called a single user (SU) mode.

PATENT LITERATURE

Citation List

Patent Literature 1: JP 5437307B

Technical Problem

DISCLOSURE OF INVENTION

An object of the technology disclosed in the present specification is to provide an excellent communication apparatus and communication method which enables preferable control of channel access operation under a multi user environment.

Solution to Problem

The technology disclosed in the present specification has been devised in light of the problem described above, a first aspect thereof is a communication apparatus that transmits a frame in which information regarding a transmission waiting period of another terminal is described.

According to a second aspect of the technology disclosed in the present specification, the communication apparatus according to the first aspect is configured to operate as an access point, and describe in the frame which notifies a subordinate terminal of allowance of multi user transmission, the information designating a transmission waiting period of the terminal after the multi user transmission is finished.

According to a third aspect of the technology disclosed in the present specification, the communication apparatus according to the second aspect is configured transmit the frame in which the information designating to each terminal a transmission waiting period longer than a transmission waiting period in a case where the communication apparatus performs multi user transmission after the multi user transmission is finished, is described.

According to a fourth aspect of the technology disclosed in the present specification, the communication apparatus according to the second aspect is configured to transmit the frame in which the information designating a transmission waiting period different for each terminal is described.

According to a fifth aspect of the technology disclosed in the present specification, the communication apparatus according to the second aspect is configured to transmit the frame in which the information designating a transmission waiting period in accordance with the number of times of transmission of the terminal is described.

According to a sixth aspect of the technology disclosed in the present specification, the communication apparatus according to the fifth aspect is configured to transmit the frame in which the information designating a transmission waiting period such that a terminal whose number of times of transmission is smaller has a shorter transmission waiting period than a terminal whose number of times of transmission is larger, is described.

According to a seventh aspect of the technology disclosed in the present specification, the communication apparatus according to the fifth aspect is configured to transmit the frame in which the information designating a shorter transmission waiting period for a terminal which performs data retransmission than a transmission waiting period of another terminal, is described.

According to an eighth aspect of the technology disclosed in the present specification, the communication apparatus according to the second aspect is configured to transmit the frame in which the information designating a longer transmission waiting period for the terminal which is allowed to perform multi user transmission, than a remaining transmission waiting period of a terminal which performs data retransmission, is described.

According to a ninth aspect of the technology disclosed in the present specification, the communication apparatus according to the second aspect is configured to transmit the frame in which a category favorable for the multi user transmission and the information designating a transmission waiting period for the terminal after the multi user transmission is finished, are described.

According to a tenth aspect of the technology disclosed in the present specification, the communication apparatus according to the ninth aspect is configured to transmit the frame in which the information designating a transmission waiting period for the terminal in accordance with the category is described.

According to an eleventh aspect of the technology disclosed in the present specification, the communication apparatus according to the ninth aspect is configured to describe, in the frame in which a category with higher priority is designated, the information designating a transmission waiting period shorter than a remaining period of a transmission waiting period set in a case where a category with lower priority is designated.

In addition, a twelfth aspect of the technology disclosed in the present specification is a communication method including: a step of transmitting a frame in which information regarding a transmission waiting period of another terminal is described.

In addition, a thirteenth aspect of the technology disclosed in the present specification is a communication apparatus that sets, on the basis of information regarding a transmission waiting period of the communication apparatus described in a received frame, a transmission waiting period after communication processing relating to the received frame is performed.

In addition, a fourteenth aspect of the technology disclosed in the present specification is a communication apparatus that transmits a frame in which information regarding a transmission waiting period of the communication apparatus upon next frame transmission is described.

According to a fifteenth aspect of the technology disclosed in the present specification, the communication apparatus according to the fourteenth aspect is configured to operate as an access point, and describe the information regarding the transmission waiting period of the communication apparatus upon the next frame transmission in the frame which notifies a subordinate terminal of allowance of multi user transmission.

According to a sixteenth aspect of the technology disclosed in the present specification, the communication apparatus according to the fifteenth aspect is configured to describe a predetermined value as the information in a case where a next frame is not transmitted for a while after the frame is transmitted.

According to the seventeenth aspect of the technology disclosed in the present specification, the communication apparatus according to the fifteenth aspect is configured to further describe in the frame, information regarding a transmission waiting period upon retransmission of a frame transmitted by the terminal through the multi user transmission.

According to an eighteenth aspect of the technology disclosed in the present specification, the communication apparatus according to the sixteenth aspect is configured to transmit the frame in which a category favorable for multi user transmission and the information regarding a transmission waiting period upon retransmission in accordance with the category are described.

In addition, a nineteenth aspect of the technology disclosed in the present specification is a communication method including: a step of transmitting a frame in which information regarding a transmission waiting period of an own communication apparatus upon next frame transmission is described.

In addition, a twentieth aspect of the technology disclosed in the present specification is a communication apparatus that sets, on the basis of information regarding a transmission waiting period upon next frame transmission by a transmission source of a frame described in the received frame, a transmission waiting period of the communication apparatus after communication processing relating to the received frame is performed.

Advantageous Effects of Invention

According to the technology disclosed in the present specification, it is possible to provide an excellent communication apparatus and communication method which enables preferable control of channel access operation of subordinate terminals as an access point under a multi user environment where a plurality of terminals exists.

According to the technology disclosed in the present specification, it is possible to provide an excellent communication apparatus and communication method which enables preferable control of channel access operation of an own terminal under a multi user environment where a plurality of terminals exists.

Note that the effects described in the present specification are merely examples, and effects of the present invention are not limited to these. Further, there is also a case where the present invention further provides additional effects other than the above-described effects.

Other objects, features and advantages of the technology disclosed in the present specification will become more clear from the detailed description based on an embodiment which will be described later and the accompanying drawings.

MODE(S) FOR CARRYING OUT THE INVENTION

An embodiment of the technology disclosed in the present specification will be described below with reference to the drawings.

In IEEE 802.11 which is one of representative standards of a wireless LAN, as a mechanism for each terminal to autonomously acquire a transmission opportunity, carrier sense multiple access/collision avoidance (CSMA/CA) is specified. Specifically, a terminal waits before transmission (performs back off) for a random period. Further, in the case where the terminal observes (performs carrier sense) a surrounding radio wave environment during back off and detects a radio wave having power equal to or greater than a certain detection threshold, the terminal stops the back off and suppresses transmission of packets. By this mechanism of back off and carrier sense, the terminals avoid collision of packets while acquiring transmission opportunities in an autonomous and distributed manner.

Normally, in the case where a mode is switched from an MU mode to an SU mode in a wireless LAN, a setting value for determining a transmission waiting period such as a contention window (CW) and back off (BO) is reset. In such a case, because a terminal station (STA) cannot restart transmission immediately after the mode is switched, it is concerned that utilization efficiency of a transmission path may degrade. Further, as a result of the setting value being reset, because the respective STAs start transmission toward an access point (AP) at the same time, there is a possibility that collision may occur.

Figure 1:
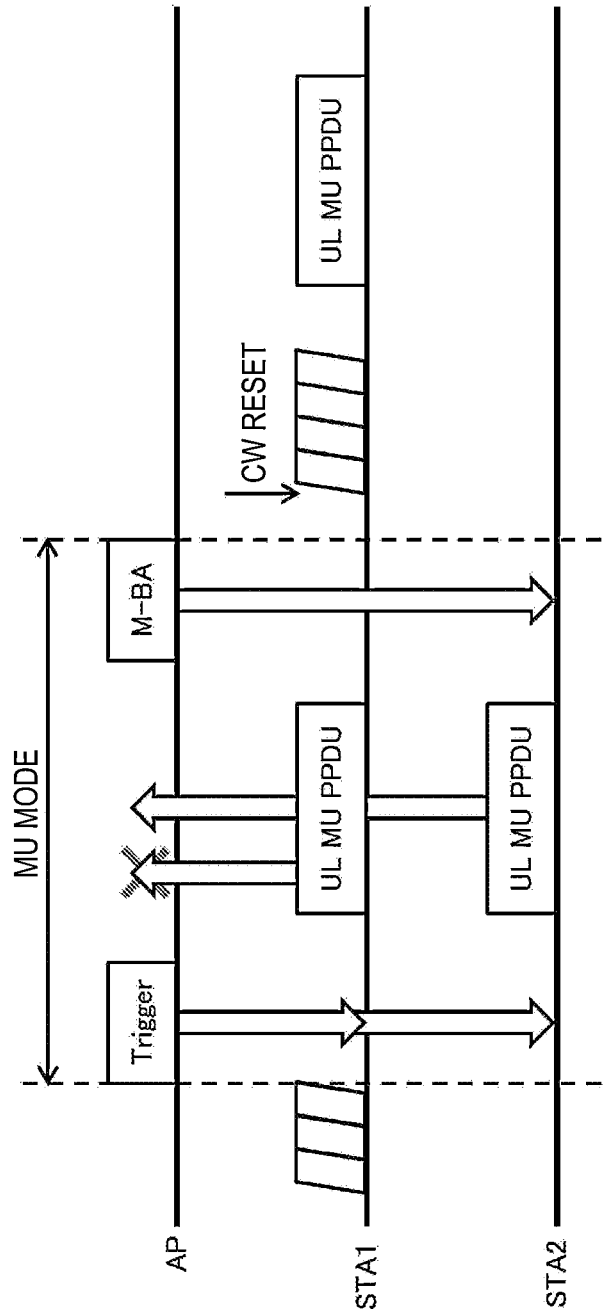
FIG. 1 is a diagram illustrating a communication sequence example in the case where a mode is switched in a wireless LAN network.
Figure 2:
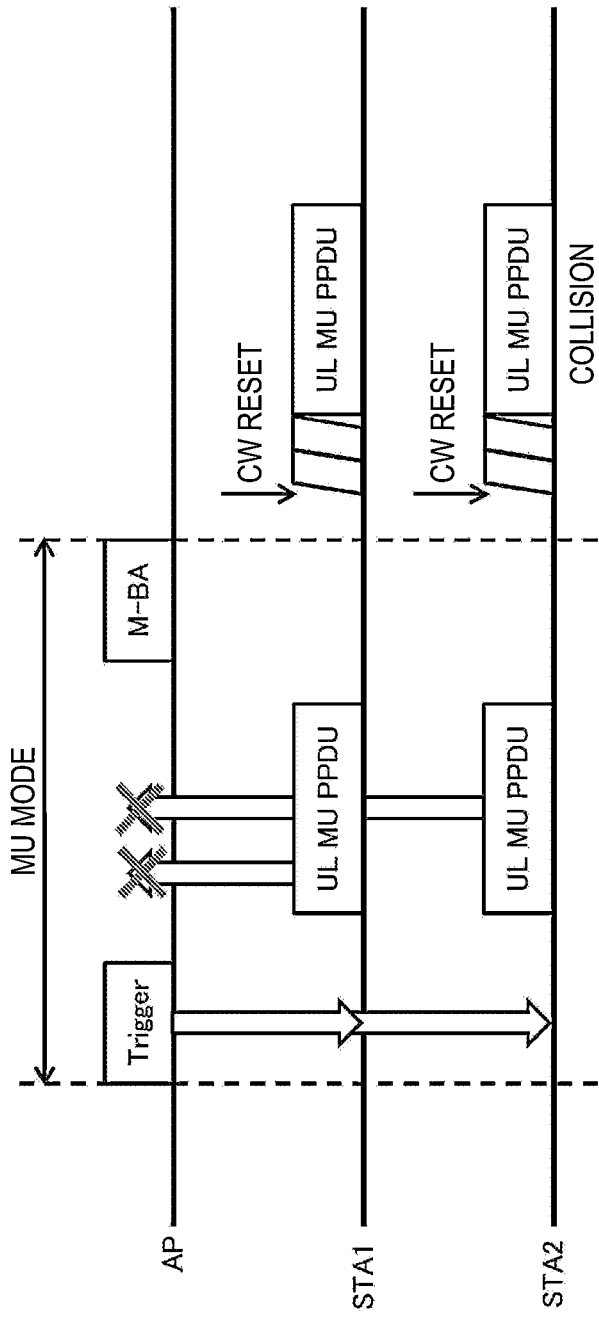
FIG. 2 is a diagram illustrating a communication sequence example in the case where a mode is switched in a wireless LAN network.
Figure 3:
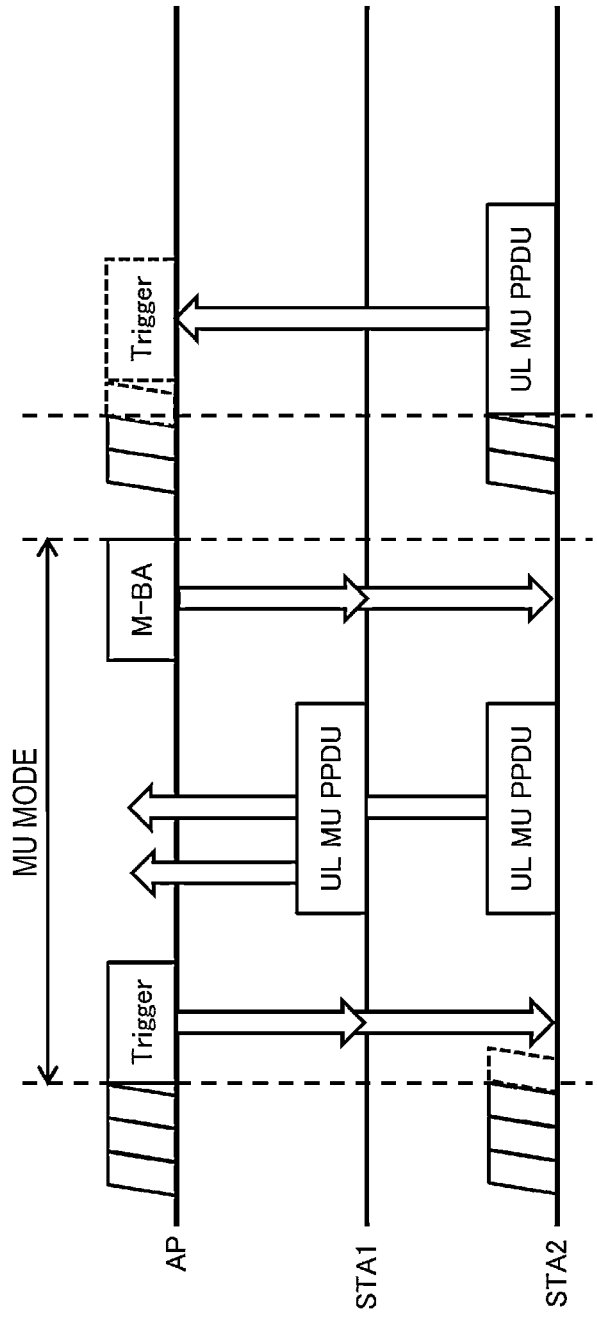
FIG. 3 is a diagram illustrating a communication sequence example in the case where a mode is switched in a wireless LAN network.

FIG. 1 to FIG. 3 illustrate communication sequence examples in the case where a mode is switched in the wireless LAN network. However, each horizontal axis in the drawings indicates a time axis, each rectangle indicates a frame transmitted from a corresponding communication apparatus at time corresponding to a position on the horizontal axis, and a parallelogram indicates a transmission waiting period. Further, an arrow extending in a vertical direction from a frame indicates a direction of transmission of the frame (an upward arrow indicates an uplink, and a downward arrow indicates a downlink).

In the example illustrated in each drawing, a network configuration is assumed where two terminal stations STA 1 and STA 2 perform communication operation under control of the access point (AP), and it is assumed that each STA has an uplink MU function, and the mode is switched to the MU mode in response to a trigger frame (Trigger) from the AP.

Further, in each drawing, the AP, the STA 1 and the STA 2 respectively set back off prior to frame transmission and can acquire transmission opportunities while an interference signal is not detected during a back off period, that is, during a CW. Typically, the CW is calculated by multiplying a random value by slot time which is approximately several micro seconds. Further, while the CW is reset in the case where packets are successfully transmitted or in the case where a communication mode is switched, if another packet transmission is started while the back off is set, the back off is interrupted, and the back off is restarted from the remaining period after transmission is finished. Also in the examples illustrated in FIG. 1 to FIG. 3, it is assumed that the AP and each STA randomly set the CW and reset the CW upon switching of the mode.

In the example illustrated in FIG. 1, while the STA 1 sets the back off, the AP transmits a trigger frame in a format which can be received by a plurality of STAs, to subordinate STA 1 and STA 2. The trigger frame described here is a frame for notifying the STA 1 and the STA 2 of transmission allowance of an uplink data frame, and gives an instruction of an accurate timing for starting transmission and an accurate duration of the frame.

The STA 1 detects a signal from the AP and interrupts the back off. Then, the STA 1 and the STA 2 enter the MU mode in response to allowance of uplink transmission through the trigger frame, start transmission of uplink data frames (UL MU PLCP protocol data unit (PPDU)) to the AP at the same time and complete the transmission at the same time in accordance with the instruction of the frame. Then, the AP transmits a multi STA block ack (M-BA) frame in a format which can be received by both the STA 1 and the STA 2, and makes a notification of a reception result of the data frame transmitted from each of the STA 1 and the STA 2.

After the STA 1 and the STA 2 receive the M-BA from the AP, the STA 1 and the STA 2 return to the SU mode. Then, while the STA whose data frame is successfully received at the AP can prepare for transmission of next new data, the STA whose data frame fails to be received prepares for retransmission of the data. In the example illustrated in FIG. 1, the AP fails in reception of the data frame transmitted from the STA 1, and the AP transmits M-BA only to the STA 2.

While the STA 1 prepares for transmitting a retransmission data frame after the MU mode is finished, the above-described interrupted back off is not restarted from the remaining period, but performed again from the beginning by the CW being reset upon returning to the SU mode. Therefore, a longer waiting period is set for the STA 1 until the STA 1 acquires a retransmission opportunity of the data frame (UL SU PPDU) by the mode being switched to the MU mode in the middle of the back off.

Further, in the example illustrated in FIG. 2, the mode of the STA 1 and the STA 2 for which uplink transmission is allowed through the trigger frame is switched to the MU mode by the AP transmitting the trigger frame for uplink (as described above).

Then, the STA 1 and the STA 2 start transmission of the uplink data frames (UL MU PPDU) at the same time and complete the transmission at the same time in accordance with the instruction of the trigger frame, and, in response to this, the AP transmits an M-BA frame and makes a notification of a reception result of the data frame transmitted from each of the STA 1 and the STA 2. Here, because the AP fails in reception of the both data frames transmitted from the STA 1 and the STA 2, the STA 1 and the STA 2 respectively prepare for transmission of retransmission data frames.

Thereafter, if the mode returns from the MU mode to the SU mode, the STA 1 and the STA 2 respectively reset CWs and try to retransmit data (UL SU PPDU) to the AP. In the example illustrated in FIG. 2, the STA 1 and the STA 2 set the CWs at CWmin (a minimum value of the CW) at the same time. Therefore, there is a problem that a possibility of occurrence of collision increases.

Further, in the example illustrated in FIG. 3, while both the AP and the STA 2 set the back off, the AP finishes the CW first, and thereby acquires a transmission opportunity, and transmits a trigger frame which makes a notification of transmission allowance of an uplink data frame to the STA 1 and the STA 2.

The STA 1 and the STA 2 enter the MU mode in response to this trigger frame, start transmission of uplink data frames (UL MU PPDU) at the same time and complete the transmission at the same time, and, in response to this, the AP transmits an M-BA frame and makes a notification of a reception result of the data frame transmitted from each of the STA 1 and the STA 2. It is assumed here that the data frames transmitted from the STA 1 and the STA 2 are both received at the AP.

Thereafter, the AP sets the back off to transmit the second trigger frame. Further, the STA 2 sets the back off to transmit a data frame (UL SU PPDU) to the AP in the SU mode. Here, because a back off counter of the STA 2 expires earlier than that of the AP, uplink single user transmission (UL SU PPDU) by the STA 2 is started, and the AP cannot transmit the second trigger frame immediately after the first uplink multiplex communication.

In short, in the example illustrated in FIG. 3, while the AP tries to perform uplink multiplex communication twice in a row, because the communication is interrupted by single user transmission by the subordinate STA 2, the AP cannot continuously start the second uplink multiplex communication. As a result, there is a problem that system throughput becomes lower than in the case where uplink multiplex communication is continuously performed.

Therefore, the present specification discloses a technology for solving the problems as illustrated in FIG. 1 to FIG. 3 by controlling channel access operation of each STA after uplink multi user communication is finished. The technology disclosed in the present specification is realized with two methods (1) and (2) described below.

(1) An access control parameter (such as a CW and BO) after the MU mode of each STA which is a transmission destination is finished is described in the trigger frame to be transmitted from the AP side. In response to this, each STA sets a parameter in accordance with the description of the trigger frame after the MU mode is finished.

(2) Access control parameters of the AP itself and the STA upon retransmission are described in the trigger frame to be transmitted from the AP side.

Among the above methods, in the method of (1), the AP appropriately sets the access control parameter after the MU is finished, which is addressed to each STA, in accordance with a status. For example, by the access control parameter being designated in accordance with priority among the STAs, it is possible to shorten a waiting period after the MU mode is finished for the STA with higher priority, so that it is possible to improve overall system throughput. Further, by the access control parameters of the respective STAs after the MU mode is finished being set at different values, it is possible to avoid collision. Still further, by each STA restarting back off without resetting a value of the access control parameter such as a CW and BO in the case where the mode is switched (in the case where the mode returns to the SU mode), each STA can acquire a channel access right immediately without the waiting period becoming long.

The AP can set the access control parameter for each STA in accordance with a status of data transmission of each subordinate STA. For example, the AP may set the access control parameter for each STA so that the respective STAs have equal transmission opportunities.

Alternatively, the AP may set the access control parameters of the subordinate STAs in cooperation with the adjacent BSS. For example, the AP may set the access control parameter of each STA so that an STA whose interference wave has less affect on the adjacent BSS can preferentially acquire a transmission opportunity.

Further, in the method of the above-described (2), each STA sets a parameter of the STA at the discretion of the STA in response to access control information of the AP. Further, the STA which performs retransmission after the MU mode is finished sets the parameter of the STA in accordance with the access control parameter of the STA upon retransmission which is described by the AP in the trigger frame.

Figure 4:
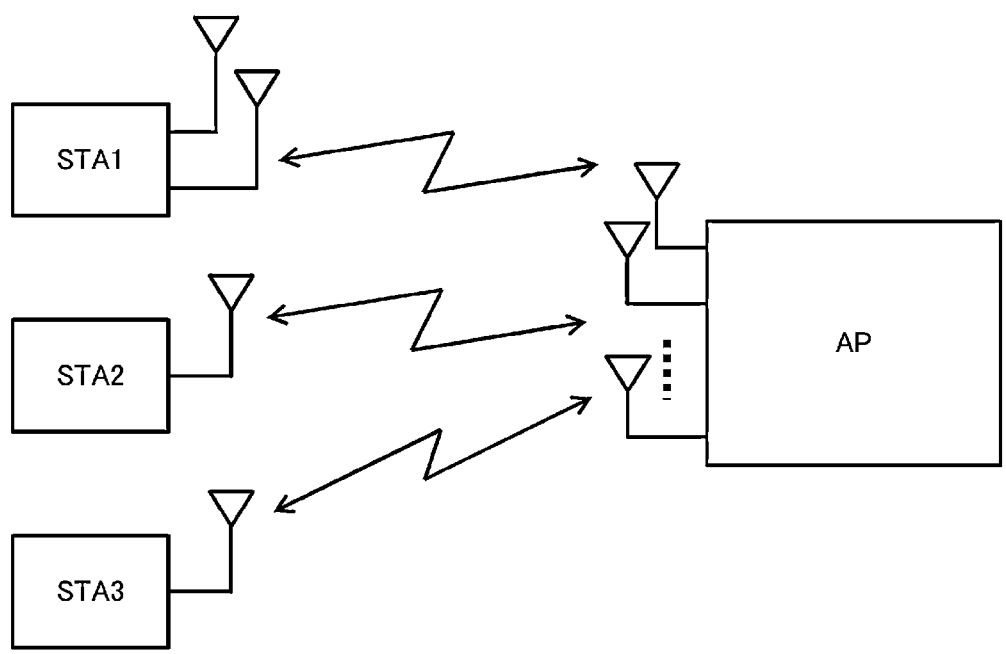
FIG. 4 is a diagram illustrating a configuration example of a wireless LAN system.

FIG. 4 schematically illustrates a configuration example of a wireless LAN system to which the technology disclosed in the present specification can be applied. The illustrated wireless LAN system includes one AP and a plurality of STAs among which connection is established, and it is assumed that the STA 1, the STA 2, the STA 3, . . . are all under the AP (or belong to a basic service set (BSS) of the AP). The AP and each STA have an OFDMA or MU-MIMO function, and are, so-called, communication apparatuses which can perform communication in the MU mode.

Figure 5:
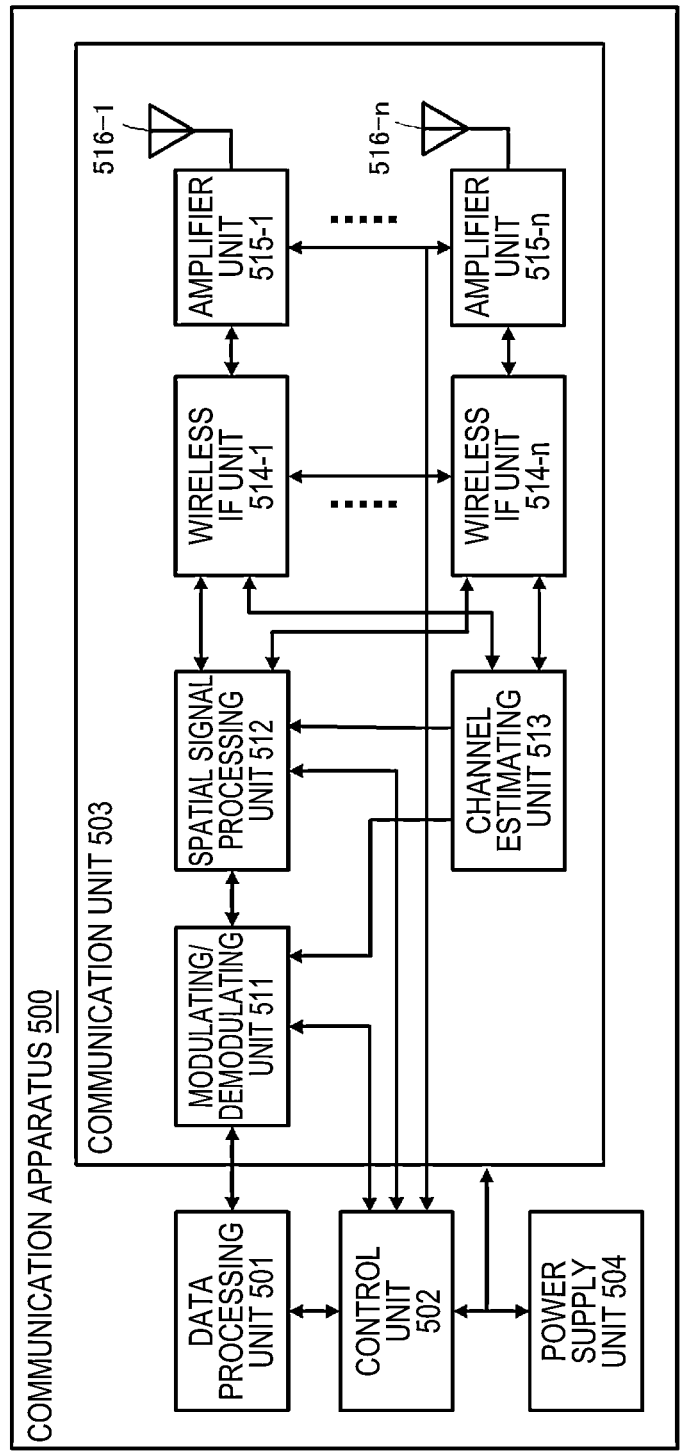
FIG. 5 is a diagram illustrating a configuration example of a communication apparatus 500.

FIG. 5 illustrates a functional configuration example of the communication apparatus 500 which performs communication operation as the AP or the STA in the wireless LAN system as illustrated in FIG. 4. It should be understood that a basic configuration of the AP is similar to that of the STA.

The communication apparatus 500 includes a data processing unit 501, a control unit 502, a communication unit 503 and a power supply unit 504. Further, the communication unit 501 further includes a modulating/demodulating unit 511, a spatial signal processing unit 512, a channel estimating unit 513, a wireless interface (IF) unit 514, an amplifier unit 515 and an antenna 516. However, one set of the wireless interface unit 514, the amplifier unit 515 and the antenna 516 may constitute one transmission/reception branch, and two or more transmission/reception branches may constitute the communication unit 501. Further, there is also a case where functions of the amplifier unit 515 are incorporated into the wireless interface unit 514.

Upon transmission during which data is input from a protocol upper layer (not illustrated), the data processing unit 501 generates a packet for wireless transmission from the data, performs processing such as addition of a header for media access control (MAC) and addition of an error detecting code, and provides the processed data to the modulating/demodulating unit 511. Further, upon reception during which there is input from the modulating/demodulating unit 511, the data processing unit 501 performs analysis of MAC Header, detection of a packet error, re-order processing, or the like, and provides the processed data to a protocol upper layer of the data processing unit 201.

The control unit 502 transfers information among respective units within the communication apparatus 500. Further, the control unit 502 performs setting of parameters at the modulating/demodulating unit 511 and the spatial signal processing unit 512, and scheduling of packets at the data processing unit 501. Still further, the control unit 502 performs setting of parameters of the wireless interface unit 514 and the amplifier unit 515, and transmission power control.

In the case where the communication apparatus 500 operates as the AP, the control unit 502 controls switching of the communication mode (shifting to the MU mode) within the own BSS. Further, in the present embodiment, the control unit 502 controls each unit so as to transmit the trigger frame in which an appropriate parameter is described to the subordinate STAs upon switching to the MU mode.

Particularly, in the present embodiment, the control unit 502 causes an access control parameter (such as a parameter for determining a transmission waiting period such as a CW and BO and a parameter regarding transmission priority, or the like,) after the MU mode of each STA which is a transmission destination is finished to be described or causes an access control parameter of the AP itself and the STA upon retransmission to be described.

Further, in the case where the communication apparatus 500 operates as the STA, the control unit 502 controls each unit to perform uplink multiplex communication with other subordinate STAs of the AP in accordance with content described in the trigger frame received from the AP. Particularly, in the present embodiment, the control unit 502 sets a transmission waiting period (a CW and BO) after the MU mode is finished in accordance with the access control parameter described in the trigger frame, sets a different value from that of other subordinate STAs or sets a parameter such as a CW and BO upon data retransmission at the discretion of the control unit 502 on the basis of the content described in the trigger frame.

Upon transmission, the modulating/demodulating unit 511 performs processing of encoding, interleaving and modulation on input data from the data processing unit 501 on the basis of a coding and modulation scheme set by the control unit 501, generates a data symbol stream and provides the data symbol stream to the spatial signal processing unit 512. Further, upon reception, the modulating/demodulating unit 511 performs processing of demodulation, de-interleaving and decoding which is inverse to the processing upon transmission, on input from the spatial signal processing unit 512 on the basis of the coding and modulation scheme set by the control unit 501, and provides the data to the data processing unit 501 or the control unit 502.

Upon transmission, the spatial signal processing unit 512 performs signal processing for space separation on the input from the modulating/demodulating unit 511 as necessary and provides the obtained one or more transmission symbol streams to respective wireless interface units 514. Meanwhile, upon reception, the spatial signal processing unit 512 performs signal processing on the received symbol streams input from the respective wireless interface units 514, performs space separation of the streams as necessary and provides the results to the modulating/demodulating unit 511.

The channel estimating unit 513 calculates complex channel gain information of a propagation path from a preamble portion and a training signal portion among input signals from the respective wireless interface units 514. Then, the calculated complex channel gain information is utilized for demodulation processing at the modulating/demodulating unit 511 and spatial processing at the spatial signal processing unit 512 via the control unit 502, thereby enabling the MU mode.

Upon transmission, the wireless interface unit 514 converts input from the spatial signal processing unit 512 into an analog signal, performs filtering and up-conversion to a carrier frequency and sends out the signal to the antenna 516 or the amplifier unit 515. Meanwhile, upon reception, the wireless interface unit 514 performs processing of down-conversion and conversion to a digital signal, which is processing inverse to processing upon transmission, on input (received signal of the carrier frequency) from the antenna 516 or the amplifier unit 515, and provides the data to the spatial signal processing unit 512 and the channel estimating unit 513.

Upon transmission, the amplifier unit 515 amplifies the analog signal input from the wireless interface unit 514 to predetermined power and sends out the signal to the antenna 516. Further, upon reception, the amplifier unit 515 amplifies low noise of the received signal input from the antenna 516 to predetermined power and outputs the signal to the wireless interface unit 514. There is a case where at least one of functions upon transmission or functions upon reception of the amplifier unit 515 is incorporated into the wireless interface unit 514.

The power supply unit 504 is constituted with a battery power supply or a fixed power supply such as a commercial power supply, and supplies power for drive to each unit within the communication apparatus 500.

Note that, while the communication apparatus 500 can further include functional modules other than the illustrated modules, because the functional modules other than the illustrated modules are not directly related to the technology disclosed in the present specification, illustration and description will be omitted here.

In the wireless LAN system, a method for setting a CW of each STA can be roughly divided into two methods of a method in which setting is made in accordance with a notification from the AP and a method in which setting is made at the discretion of the STA. The same will also apply to a method for setting a BO. In the following description, description will be provided using Example 1 which uses the method in which setting is made at the discretion of the AP and Example 2 which uses the method in which setting is made at the discretion of the STA.

Example 1

Figure 6:
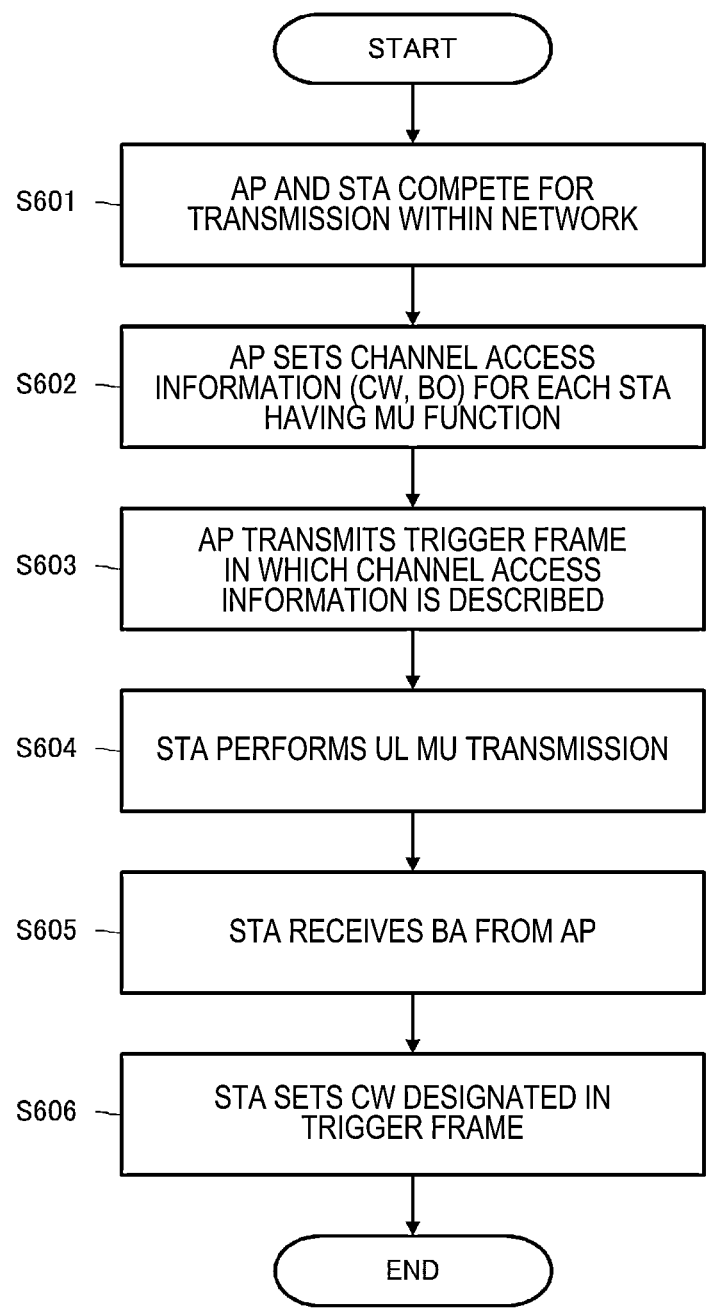
FIG. 6 is a flowchart illustrating operation procedure within the wireless LAN system.

FIG. 6 illustrates operation procedure within the wireless LAN system in a form of a flowchart, in the case where a CW for each STA is set in accordance with a notification from the AP.

In the wireless LAN, specifications for randomly accessing a channel are employed. Therefore, the AP and each subordinate STA compete with each other to perform transmission within the network (step S601).

Here, the AP has already acquired information of the STAs having an MU function at an early stage at which the AP is connected to each STA. Therefore, the AP sets parameters for channel access (such as a CW and BO) to a plurality of STAs having the MU function and creates a trigger frame in which these set parameters for channel access are described (step S602). Then, the AP transmits the above-described trigger frame in which the parameters for channel access are described to each STA for which uplink data transmission to the AP in the MU mode is allowed after acquiring a channel access right (step S603).

The mode of each STA which receives the trigger frame is switched to the MU mode, and each STA starts transmission of the uplink data frame (UL MU PPDU) at the same time and completes the transmission at the same time in accordance with an instruction of the trigger frame (step S604).

In response to this, the AP makes a notification of a reception result of the data frame transmitted from each STA (step S605). The AP notifies each STA of this reception result by transmitting an M-BA frame (mentioned above) or transmitting a BA frame (not illustrated) to each STA through downlink multiplex transmission or a plurality of times of single user transmission.

Each STA sets a CW value described in the trigger frame received in step S603 after communication with the AP is completed, that is, after the MU mode is finished (step S606). For example, the STA which receives a notification indicating that the AP fails in reception of the data frame transmitted in the MU mode can shorten a waiting period or avoid collision with other STAs by performing access control of a channel using the CW value set in accordance with the description of the trigger frame upon returning to the SU mode.

The above-described method (1) is a method in which the AP sets at least one parameter value of the CW or the BO of each STA after the MU mode is finished at the discretion of the AP. The AP describes information to be used for setting a transmission waiting period at the STA side, such as a parameter value of the CW or the BO designated to each STA in the trigger frame, and transmits the trigger frame to each STA as a cue for uplink multiplex communication.

Figure 7:
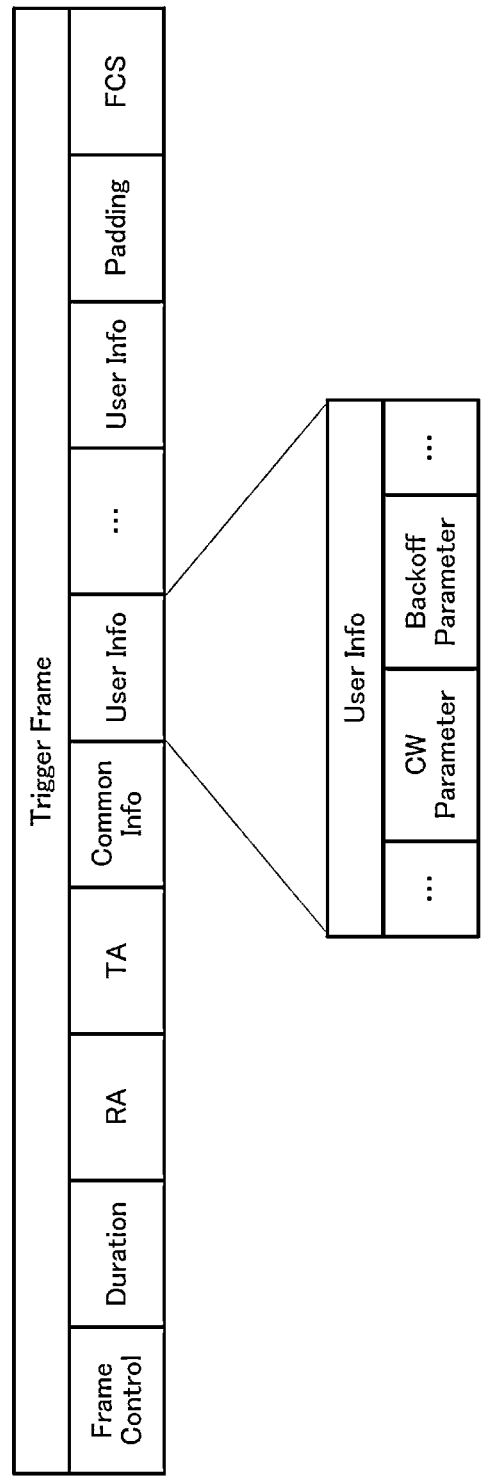
FIG. 7 is a diagram illustrating a configuration example of a trigger frame.

FIG. 7 illustrates a configuration example of the trigger frame including description of the parameter value of the CW or the BO to be designated to each STA. The trigger frame has a user information (User Info) filed for information for each STA (user) other than information common among the STAs which become destinations. In the frame configuration example illustrated in FIG. 7, the parameter values of the CW and the BO set for each STA at the discretion of the AP are described in the respectively corresponding User Info fields. Further, in the illustrated example, while the both parameter values of the CW and the BO are included in the respective User Info fields, it is also possible to employ a configuration where only one of the parameter values is included.

There are some possible methods for the AP to determine the parameter value of the CW or the BO of each STA. For example, examples of the methods include a method in which the CW is set using the number of times of transmission of each STA, a method in which the CW is set in accordance with priority of each STA, a method in which the CW is set in accordance with an access category (AC), or the like.

The method for the AP to set the CW on the basis of the number of times of transmission of each STA will be described with reference to the communication sequence example illustrated in FIG. 8. However, in the drawing, each rectangle indicates a frame, an arrow indicates a direction of transmission (an upward arrow indicates an uplink, and a downward arrow indicates a downlink). Further, a network configuration is assumed where three terminal stations STA 1, STA 2 and STA 3 perform communication operation under control of the AP, and it is assumed that each STA has an uplink MU function. Further, a CW value set for the i-th terminal STAi immediately after the n-th multi user transmission is expressed as $CW\_i\_n$. The terminal STAi can calculate a transmission waiting period immediately after the n-th multi user transmission by multiplying $CW\_i\_n$ by slot time (the same hereinafter).

In the case where the AP acquires a channel access right, in the case where the AP performs reception through UL MU from the STA 1 and the STA 2, the AP describes the CW values $CW\_1\_1$ and $CW\_2\_1$ respectively set for the STA 1 and the STA 2 on the basis of an expected duration of UL MU in the first trigger frame and transmits the first trigger frame. Note that, while there is a case where corresponding values of BO $Backoff\_1\_1$ and $Backoff\_2\_1$ are set at the respective STAs, to simplify the description, this case will be omitted in the following description. The AP sets different values as $CW\_1\_1$ and $CW\_2\_1$ respectively at the STA 1 and the STA 2 at the discretion of the AP. Therefore, collision does not occur by the STA 1 and the STA 2 transmitting frames at the same time after UL MU is finished.

The STA 1 and the STA 2 start transmission of uplink data frames (UL MU PPDU) at the same time and complete the transmission at the same time in accordance with an instruction of the trigger frame. Then, the AP transmits an M-BA frame to make a notification of a reception result of the data frame transmitted from each of the STA 1 and the STA 2. It is assumed in the illustrated example that the data frames transmitted from the STA 1 and the STA 2 are both successfully received at the AP, and the AP transmits M-BA which makes a notification of the reception result to the STA 1 and the STA 2.

Figure 8:
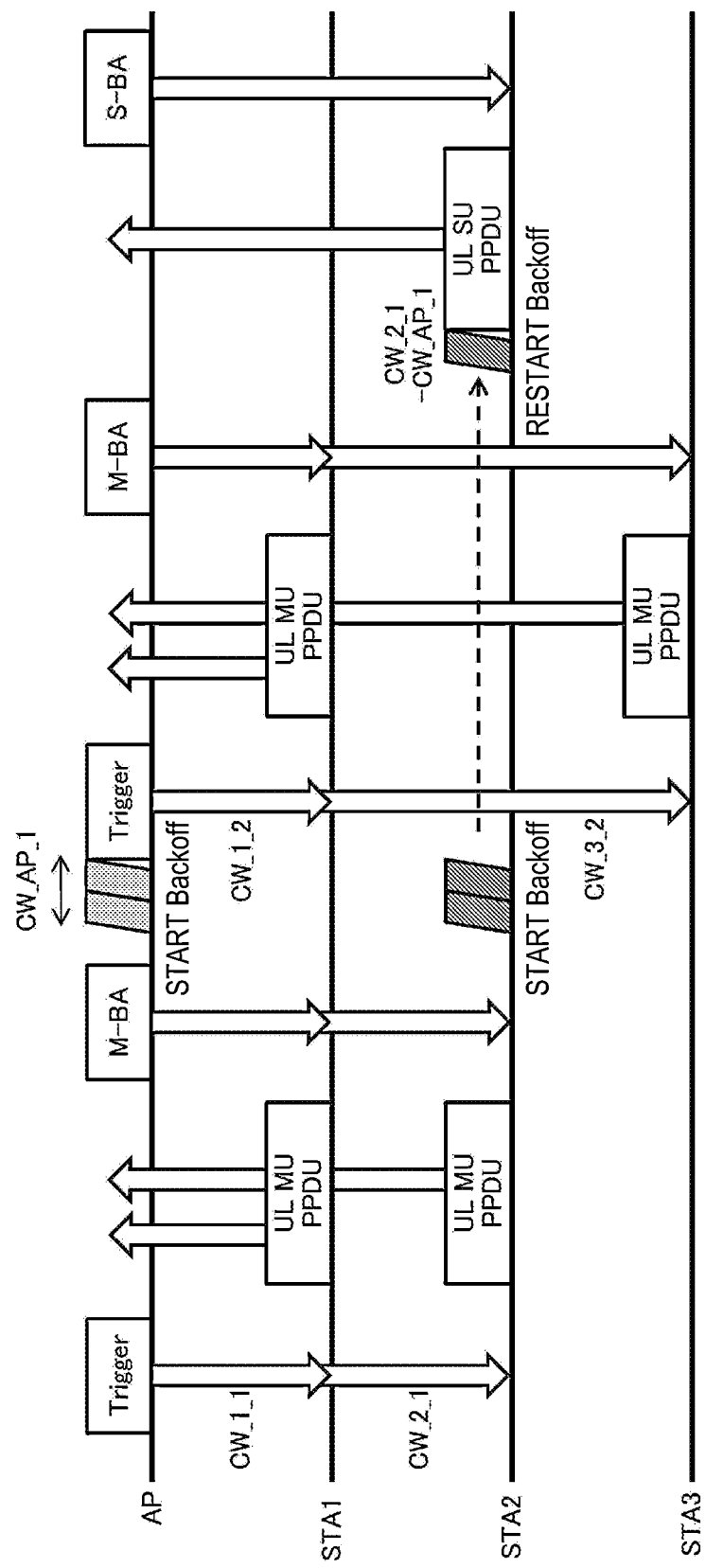
FIG. 8 is a diagram illustrating a communication sequence example (CW setting by the number of times of transmission) in which a parameter value of CW of each STA is set at the discretion of an AP.

Further, in the example illustrated in FIG. 8, it is expected that the AP further performs reception from the STA using the second UL MU. Therefore, both the CW setting values $CW\_1\_1$ and $CW\_2\_1$ respectively for the STA 1 and the STA 2 described in the first trigger frame are set greater than a CW setting value $CW\_AP\_1$ for the AP itself. Conditions for the CW set for each of the AP, the STA 1 and the STA 2 will be described below.

$$CW\_1\_1 \neq CW\_2\_1$$

$$CW\_1\_1, CW\_2\_1 > CW\_AP\_1$$

After the first UL MU transmission is finished, the AP and the STA 2 have a schedule for transmission within the network, and both start back off. As described above, the CW value $CW\_2\_1$ set by the AP for the STA 2 and designated in the first trigger frame is greater than the CW value $CW\_AP\_1$ set for the AP itself. Therefore, after the first UL MU transmission is finished, there is a high possibility that the AP preferentially acquires a channel access right. Therefore, the AP can continuously transmit the second trigger frame, so that it becomes easy to perform reception from the STA in the second UL MU. In this event, the STA 2 interrupts the back off.

Further, while the AP allows uplink data transmission for the STA 1 and the STA 3 in the second UL MU, because data transmission is not allowed for the STA 2, the AP describes the CW values $CW\_1\_2$ and $CW\_3\_2$ respectively set for the STA 1 and the STA 3 on the basis of an expected duration of the second UL MU in the second trigger frame and transmits the second trigger frame.

The STA 1 and the STA 3 start transmission of the second uplink data frames (UL MU PPDU) at the same time and complete the transmission at the same time in accordance with an instruction of the second trigger frame. In this event, the AP successfully receives the data frames from the STA 1 and the STA 3, and transmits M-BA which makes a notification of reception results to the STA 1 and the STA 3.

After the second UL MU transmission is finished, because the STA 2 still has a schedule of transmission, the STA 2 restarts back off which is interrupted by transmission of the second trigger frame from the AP. Here, the CW of the STA 2 is not reset upon returning to the SU mode. Therefore, because the STA 2 restarts back off with the remaining value of $CW\_2\_1$ (that is, $CW\_2\_1-CW\_AP\_1$) after the second UL MU transmission is finished, the STA 2 can immediately acquire a channel access right, so that the STA 2 can easily perform transmission in the SU mode. Then, in the case where the AP successfully receives the data frame (UL SU PPDU) from the STA 2, the AP transmits S-BA which makes a notification of the reception result to the STA 2.

Meanwhile, in the case where the STA 1 acquires more UL MU transmission rights than STA 2 and the STA 3 at a time point at which the first UL MU mode is finished, by transmission priority of the STA 1 being lowered, fairness of the system is improved. For example, by CW_1_2 of the STA 1 being made greater than CW_3_2 of the STA 3 in the second trigger frame in accordance with the following conditions, it is possible to lower transmission priority of the STA 1 (or increase transmission priority of the STA 3) by shortening a transmission waiting period of the STA 3 at a time point at which the second UL MU mode is finished. Further, by CW_1_2 of the STA 1 being set greater than a CW value (CW_2_1–CW_AP_1) corresponding to the remaining transmission waiting period of the STA 2, it is possible to lower transmission priority of the STA 1 (or increase transmission priority of the STA 2) by making the transmission waiting period of the STA 2 which restarts back off shorter than the transmission waiting period of the STA 1 at a time point at which the second UL MU mode is finished.

$$CW\_1\_2 > CW\_3\_2$$

$$CW\_1\_2 > CW\_2\_1 - CW\_AP\_1$$

By the above-described setting conditions of the CW value of each STA, an effect is provided that it is possible to secure transmission priority of the STA 2 and the STA 3 which have a smaller number of times of transmission by postponing transmission start time of the STA 1 after the second MU mode is finished.

Figure 9:
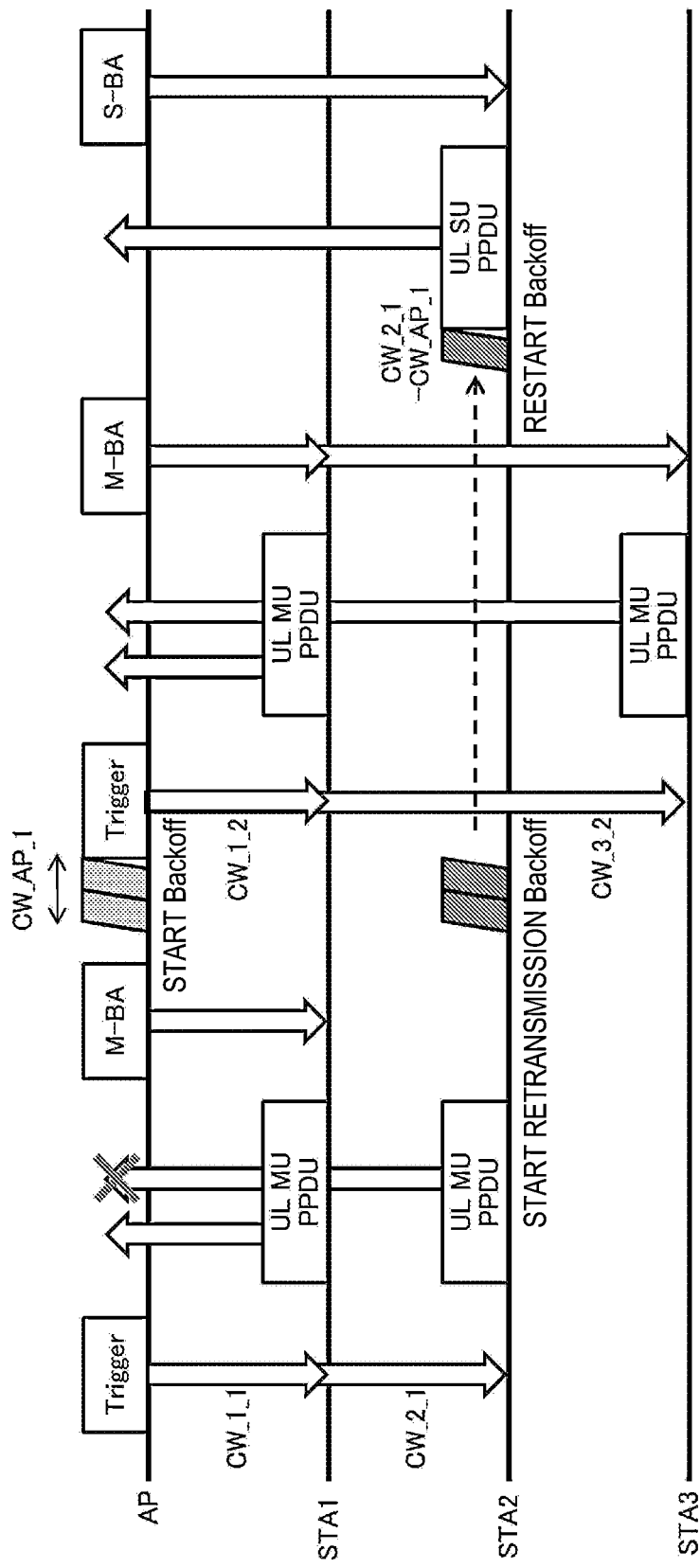
FIG. 9 is a diagram illustrating a communication sequence example (CW setting by retransmission) in which the parameter value of the CW of each STA is set at the discretion of the AP.

Subsequently, a method for the AP to set a CW through retransmission will be described with reference to the communication sequence diagram illustrated in FIG. 9. However, in the drawing, each rectangle indicates a frame, and an arrow indicates a direction of transmission (an upward arrow indicates an uplink, and a downward arrow indicates a downlink). Further, a network configuration is assumed where three terminal stations STA 1, STA 2 and STA 3 perform communication operation under control of the AP, and it is assumed that each STA has an uplink MU function.

If the AP acquires a channel access right, in the case where the AP performs reception through UL MU from the STA 1 and the STA 2, the AP describes the CW values CW_1_1 and CW_2_1 respectively set at the STA 1 and the STA 2 in the first trigger frame and transmits the first trigger frame.

Here, in the case where it is expected that the AP further performs reception from the STA through the second UL MU, in a similar manner to the communication sequence example illustrated in FIG. 8, both the CW setting values CW_1_1 and CW_2_1 for the respective STA 1 and the STA 2 described in the first trigger frame may be set greater than the CW setting value CW_AP_1 of the AP itself.

The STA 1 and the STA 2 start transmission of the first uplink data frames (UL MU PPDU) at the same time and complete the transmission at the same time in accordance with an instruction in the trigger frame. In this event, while the AP successfully receives the data frame from the STA 1, the AP fails in reception of the data frame from the STA 2. Therefore, the AP encourages the STA 2 to retransmit the data by excluding BA addressed to the STA 2 in M-BA which makes a notification of the reception result.

After the first UL MU transmission is finished, the AP starts back off to further perform reception from the STA through the second UL MU. Further, the STA 2 starts back off to retransmit the data frame which has failed to be received at the AP. In the case where the CW value CW_2_1 set by the AP for the STA 2 and indicated in the first trigger frame is greater than the CW value CW_AP_1 set for the AP itself, the AP preferentially acquires a channel access right and continuously transmits the second trigger frame. In this event, the STA 2 interrupts the back off.

Further, while the AP allows uplink data transmission for the STA 1 and the STA 3 in the second UL MU, because data transmission is not allowed for the STA 2, the AP describes the CW values CW_1_2 and CW_3_2 respectively set for the STA 1 and the STA 3 on the basis of an expected duration of the second UL MU in the second trigger frame and transmits the second trigger frame.

The STA 1 and the STA 3 start transmission of the second uplink data frames (UL MU PPDU) at the same time and complete the transmission at the same time in accordance with an instruction of the second trigger frame. In this event, the AP successfully receives the data frames from the STA 1 and the STA 3, and transmits M-BA which makes a notification of reception results to the STA 1 and the STA 3. Meanwhile, because transmission by the STA 2 is not allowed in the second trigger frame, the STA 2 cannot retransmit the data which has failed to be received at the AP, through the second UL MU.

After the second UL MU transmission is finished, because the STA 2 has a schedule of retransmitting the data to the AP, the STA 2 restarts back off for data retransmission through the second trigger frame transmission from the AP. Here, retransmission by the STA 2 is made to be preferentially performed after the second UL MU mode is finished.

For example, by CW_1_2 of the STA 1 being set greater than the CW value (CW_2_1–CW_AP_1) corresponding to the remaining transmission waiting period of the STA 2 and CW_3_2 of the STA 3 being set greater than the CW value (CW_2_1–CW_AP_1) corresponding to the remaining transmission waiting period of the STA 2 in the second trigger frame in accordance with the following conditions, it is possible to increase priority of retransmission by the STA 2 by making the transmission waiting period of the STA 2 which restarts back off at a time point at which the second UL MU mode is finished shorter than the transmission waiting periods of the STA 1 and the STA 3.

$$CW\_1\_2 > CW\_2\_1 - CW\_AP\_1$$

$$CW\_3\_2 > CW\_2\_1 - CW\_AP\_1$$

According to the above-described setting conditions of the CW value of each STA, by the transmission waiting periods of the STA 1 and the STA 3 being set longer, even if at least one of the STA 1 or the STA 3 starts back off after the second MU mode is finished, an effect is provided that the STA 2 can preferentially perform retransmission.

That is, because the STA 2 restarts back off with the remaining value of CW_2_1 (CW_2_1–CW_AP_1) without resetting the CW value upon returning to the SU mode, the STA 2 can acquire a channel access right immediately, so that the STA 2 can easily perform data retransmission. Then, if the AP successfully receives the data frame (UL SU PPDU) from the STA 2, the AP transmits S-BA which makes a notification of a reception result to the STA 2.

Subsequently, a method for the AP to set the CW in accordance with an AC level will be described.

Figure 10:
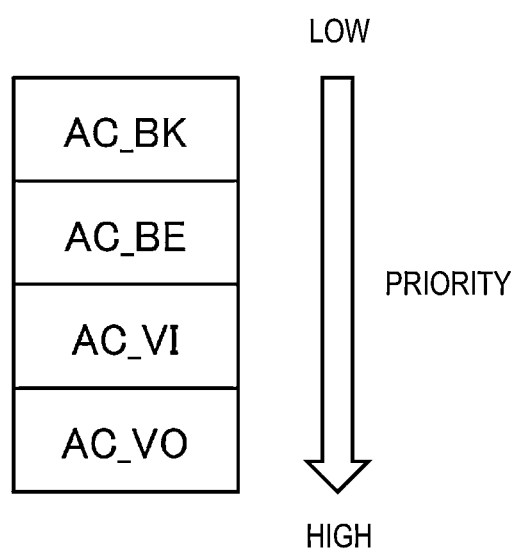
FIG. 10 is a diagram illustrating priority of an AC level.

For example, in enhanced distributed channel access (EDCA) specified in IEEE 802.11e standards which are directed to providing a quality of service (QoS) function, a mechanism is employed where packets are classified into four ACs, stored in respective queues and transmitted in accordance with priority for each AC. Four ACs described here are AC_VO (Voice), AC_VI (Video), AC_BE (Best Effort) and AC_BK (Background), and priority of each AC is as indicated in FIG. 10.

To maximize the effect of MU, it is considered desirable that the AP allows data transmission by the STAs having the same AC at the same time in the UL MU mode. To realize this, a favorable AC level is described in a Common Info field (see FIG. 7) of the trigger frame transmitted from the AP, and, in response to this, a signal which best meets the AC level is transmitted at the STA side which is allowed to perform transmission. The STA transmits a packet having priority which is the same as or higher than the AC level designated in the trigger frame in the UL MU mode in the case where transmission is allowed in the trigger frame.

Figure 11:
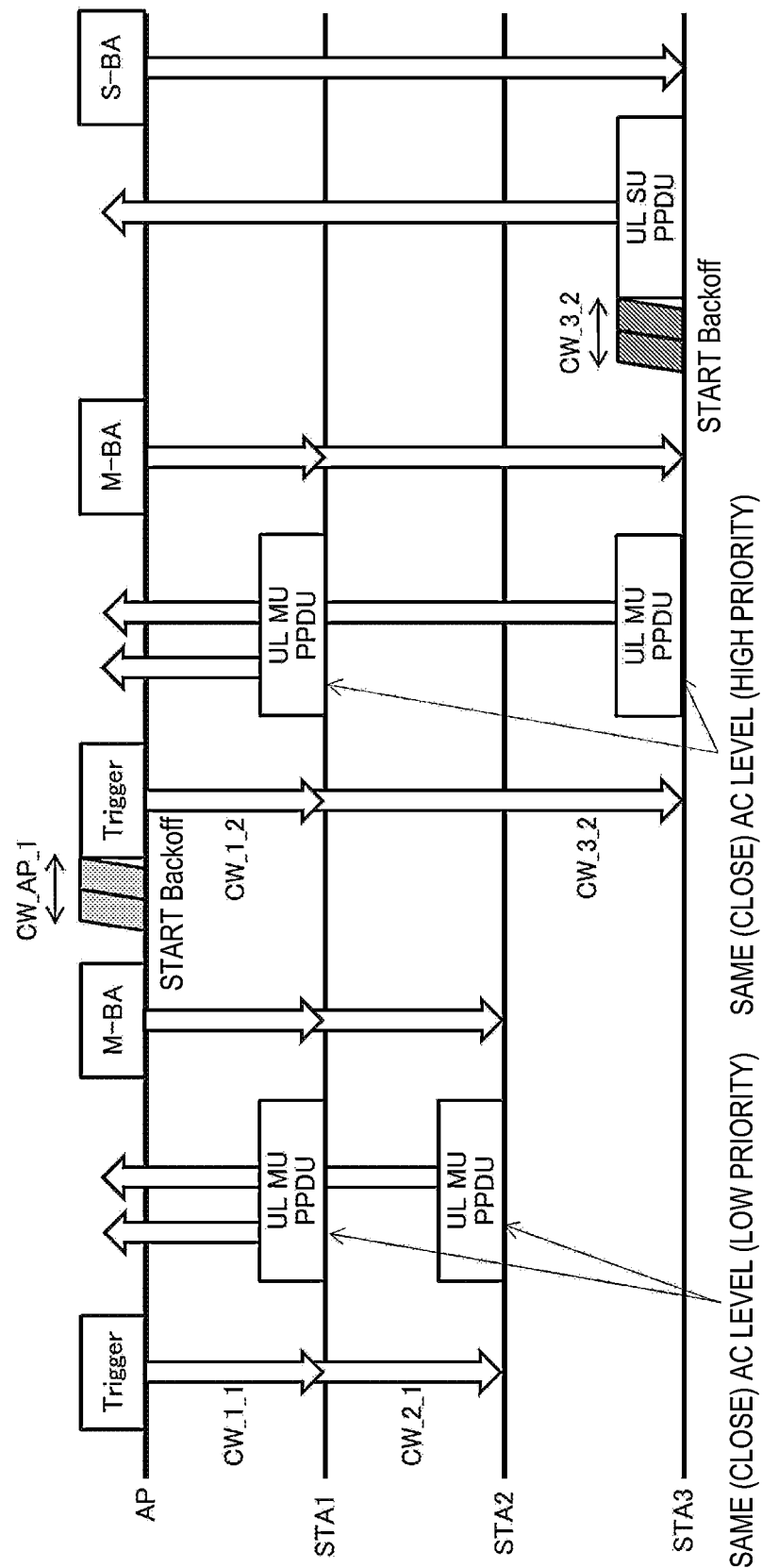
FIG. 11 is a diagram illustrating a communication sequence example (CW setting in accordance with the AC level) in which the parameter value of the CW of each STA is set at the discretion of the AP.

In this method, the AP sets CWs to a plurality of STAs in accordance with the respective AC levels. A method to set a CW in accordance with the AC level will be described with reference to the communication sequence diagram illustrated in FIG. 11. However, in the drawing, each rectangle indicates a frame, and an arrow indicates a direction of transmission (an upward arrow indicates an uplink, and a downward arrow indicates a downlink). Further, a network configuration is assumed where three terminal stations STA 1, STA 2 and STA 3 perform communication operation under control of the AP, and it is assumed that each STA has an uplink MU function.

In the case where the AP acquires a channel access right, the AP describes a favorable AC level in the Common Info field of the first trigger frame, describes the CW values set on the basis of priority of the AC (se FIG. 10) for the STA 1 and the STA 2 which are allowed to perform transmission in the respective User Info fields, and performs transmission. Basically, a smaller CW value is set for the AC with higher priority. Here, because the AC levels of the STA 1 and the STA 2 are lower, transmission is performed while greater CW values CW_1_1 and CW_2_1 are set and described in the first trigger frame.

The STA 1 and the STA 2 start transmission of packets having priority which is the same as or higher than the AC level designated in the trigger frame at the same time and complete the transmission at the same time. In this event, the AP successfully receives data frames from the STA 1 and the STA 2 and transmits M-BA which makes a notification of reception results to the STA 1 and the STA 2.

After the first UL MU transmission is finished, the AP starts back off to further perform reception from the STA through the second UL MU, and if the AP acquires a channel access right, the AP continuously transmits the second trigger frame. Here, the AP sets a higher AC level than that in the previous MU mode, sets smaller CW values CW_1_2 and CW_3_2 for the STA 1 and the STA 3 for which transmission is allowed in accordance with the AC levels, and transmits the second trigger frame in which these kinds of information are described. For example, the AP sets CW_1_2 of the STA 1 smaller than the CW values (CW_1_1−CW_AP_1 and CW_2_1−CW_AP_1) corresponding to remaining periods of the transmission waiting periods respectively set by the STA 1 and the STA 2 in accordance with the first trigger frame with low priority, and sets CW_3_2 of the STA 3 smaller than the CW values (CW_1_1−CW_AP_1 and CW_2_1−CW_AP_1) corresponding to the remaining transmission periods in a similar manner, in the second trigger frame in which the AC level with high priority is designated, in accordance with the following conditions.

CW_1_2>CW_1_1−CW_AP_1,CW_2_1−CW_AP_1

CW_3_2>CW_1_1−CW_AP_1,CW_2_1−CW_AP_1

Further, because the STA 1 has already been able to perform second data transmission, in terms of fairness of the system (mentioned above), CW_3_2 is set at a smaller value than CW_1_2 to lower priority of the STA 1 in accordance with the number of times of transmission.

CW_3_2<CW_1_2

The STA 1 and the STA 3 start transmission of the second uplink data frames (UL MU PPDU) at the same time and complete the transmission at the same time in accordance with an instruction of the second trigger frame. In this event, the AP successfully receives the data frames from the STA 1 and the STA 3, and transmits M-BA which makes a notification of reception results to the STA 1 and the STA 3.

After the second UL MU transmission is finished, because the STA 3 still has a schedule of transmission, the STA 3 starts back off using a CW setting value (CW_3_2) described in the second trigger frame. As mentioned above, CW_3_2 is smaller than any of the CW values (CW_1_1−CW_AP_1 and CW_2_1−CW_AP_1) corresponding to the remaining periods of the back off periods set by the STA 1 and the STA 2 after the first UL MU transmission, and is smaller than CW_1_2 designated in the second trigger frame for the STA 1. Therefore, the STA 3 which has a high AC level and which has performed UL MU transmission easily acquires a transmission opportunity.

Then, the STA 3 transmits a data frame (UL SU PPDU) to the AP in the SU mode in the case where the STA 3 can acquire a channel access right. Then, in the case where the AP successfully receives the data frame from the STA 3, the AP transmits S-BA which makes a notification of a reception result to the STA 3.

While the three methods in which the CW is set at the discretion of the AP have been described above, in actual operation, it is sufficient if the AP comprehensively performs judgement to control a value of the CW or the BO of each STA using these three methods at the same time.

Figure 12:
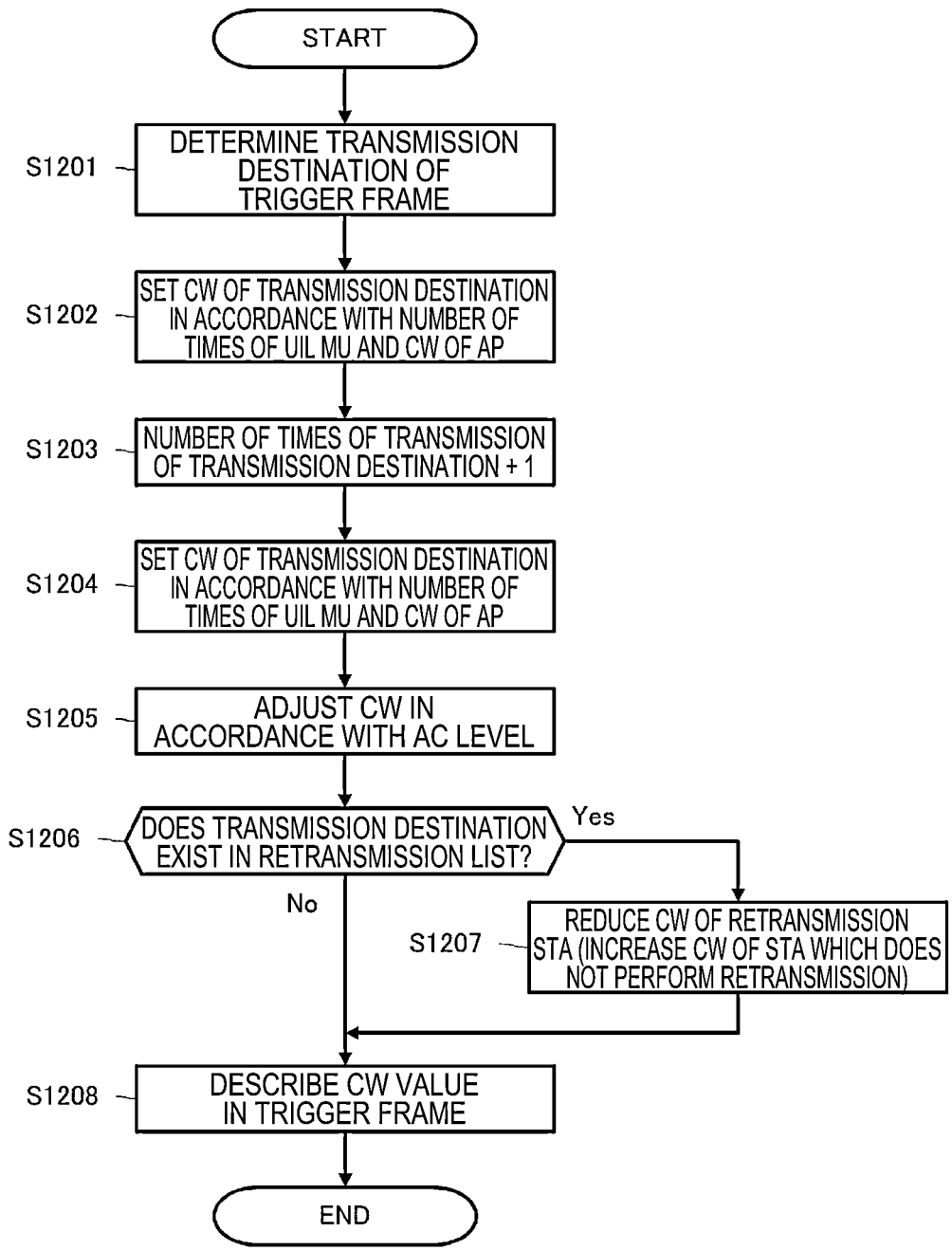
FIG. 12 is a flowchart illustrating processing procedure in the case where the AP transmits the trigger frame.

FIG. 12 illustrates processing procedure in a form of a flowchart, for the AP to transmit the trigger frame in the present example. The illustrated processing procedure is basically performed mainly by the control unit 502 in the case where the communication apparatus 500 illustrated in FIG. 5 operates as the AP.

The AP first determines a transmission destination of the trigger frame, that is, an STA which is allowed to perform uplink data transmission to the AP itself in the next MU mode (step S1201).

Then, the AP sets the number of times of transmission in the UL MU mode. In this event, in the case where it is expected that the AP continuously performs UL MU communication, the AP sets a CW value greater than the CW value of the AP itself for each STA (step S1202).

Then, the AP increments by one the number of times of transmission in the UL MU mode of each STA which is allowed to perform transmission (step S1203).

Then, the AP sets a CW value for each STA which is allowed to perform transmission in step S1201 in accordance with the number of times of transmission (step S1204). Specifically, the AP sets a smaller CW value for the STA whose number of times of transmission is smaller (mentioned above).

Further, the AP adjusts the CW value set for each STA in accordance with the AC level described in the trigger frame (step S1205).

Then, the AP checks whether each STA which becomes a transmission destination of the trigger frame exists in a retransmission list (step S1206). Then, in the case where an STA which is a transmission destination exists in the retransmission list (step S1206: Yes), the AP reduces the CW value of the STA (step S1207). Alternatively, in step S1207, processing may be replaced with processing of increasing a CW value of an STA which does not exist in the retransmission list (that is, which does not perform retransmission).

Then, the AP describes the CW values of the respective STAs set as described above in the respective corresponding User Info fields in the trigger frame (step S1208) and finishes the present processing routine.

Example 2

In the method in which the CW or the BO is set at the discretion of the STA, upon setting other than upon retransmission, instead of the setting value of the CW or the BO of each STA being designated from the AP, the STA sets a parameter value of the CW, the BO, or the like, on the basis of the information described in the trigger frame received from the AP in addition to at the discretion of the STA.

Figure 13:
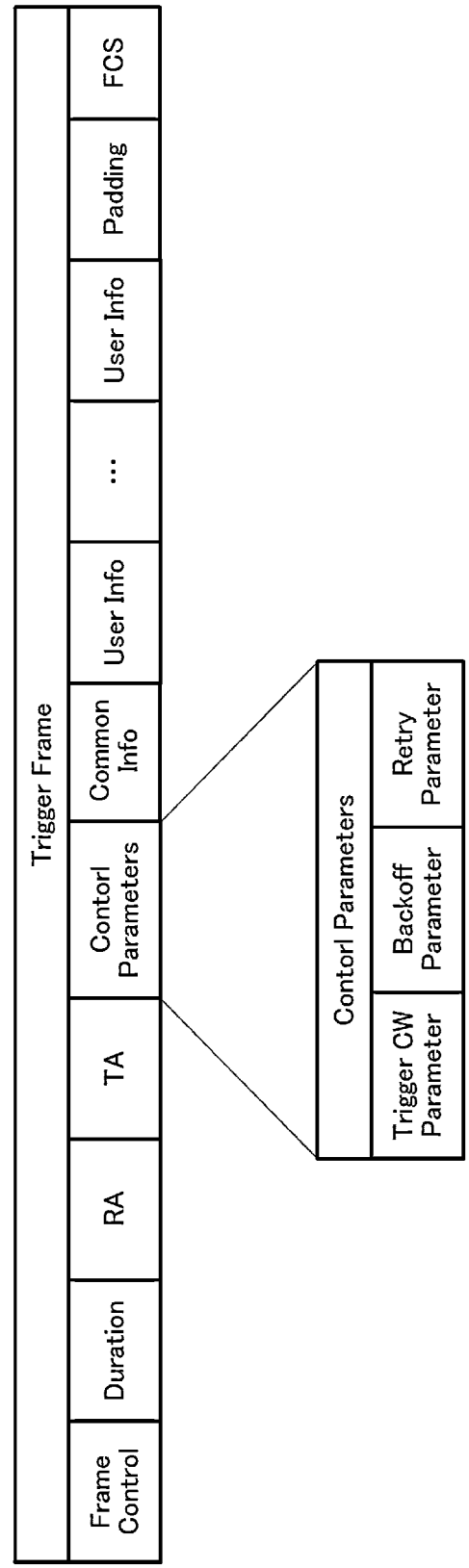
FIG. 13 is a diagram illustrating a configuration example of the trigger frame.

FIG. 13 illustrates a configuration example of the trigger frame used in this method. In the illustrated trigger frame, a field called a Control Parameters field is added. The Control Parameters field includes Trigger CW Parameter, Backoff Parameter, and Retry Parameter.

Among these, Trigger CW Parameter and Backoff Parameter respectively describe values of the CW and the BO in the case where the AP transmits the next trigger frame. The subordinate STA which receives the trigger frame, for example, sets a CW value which is greater than the CW value of the AP at the discretion of the STA so as to prevent interruption in a trigger frame which the AP tries to transmit next.

Further, Retry Paremeter is a CW setting value for only the STA which performs retransmission, and controls the CW value in the case where the STA which receives the trigger frame performs retransmission. The AP sets Retry Parameter in accordance with the priority. For example, the AP determines the CW value upon retransmission by the STA in accordance with the AC level. By smaller Retry Parameter being described in a trigger frame in which an AC level with higher priority is described, the STA whose priority of the AC is higher can perform transmission first in the case where a plurality of STAs performs retransmission.

Note that, in the case where the AP does not perform UL MU for a while after the AP finishes UL MU communication of this time, the subordinate STA may be notified by, for example, a certain value (for example, 0) being described in Trigger CW Parameter and Backoff Parameter. The STA which receives such a trigger frame only has to perform back off using a predetermined method.

In the case where it is expected that the AP further performs reception from the STA through the second UL MU, the AP can make a notification of a waiting period until the AP transmits the next trigger frame through description of Trigger CW Parameter or Backoff Parameter within the trigger frame. In response to this, the STA side sets a longer waiting period for the STA than the waiting period for the AP notified in the trigger frame. By this means, the STA cannot interrupt the AP immediately after the UL MU communication is finished, so that the AP can easily and continuously start UL MU communication.

Figure 14:
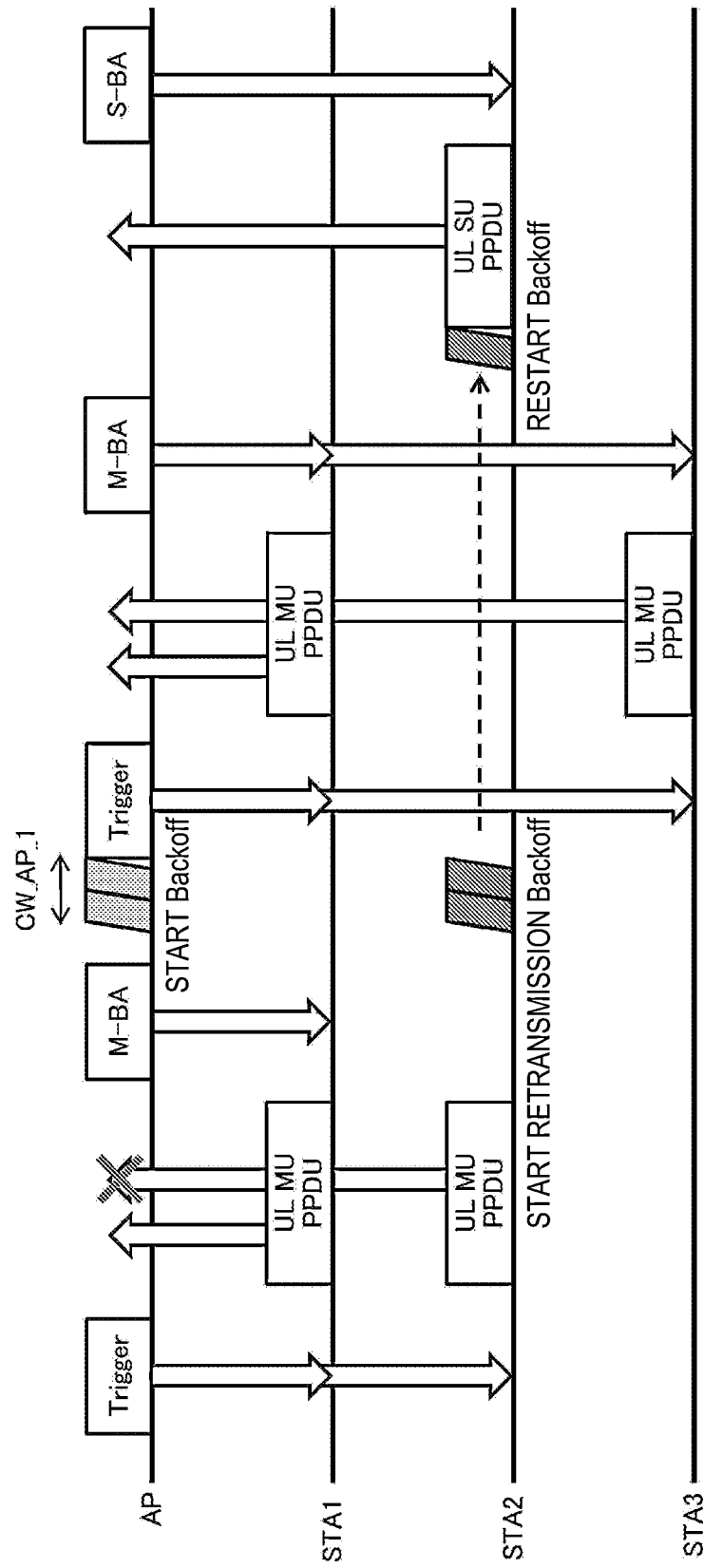
FIG. 14 is a diagram illustrating a communication sequence example in which the parameter value of the CW of each STA is set at the discretion of the STA.

A method for the STA to receive the trigger frame illustrated in FIG. 13 from the AP and set the CW at the discretion of the STA will be described with reference to the communication sequence diagram illustrated in FIG. 14. However, in the drawing, each rectangle indicates a frame, and an arrow indicates a direction of transmission (an upward arrow indicates an uplink, and a downward arrow indicates a downlink). Further, a network configuration is assumed where three terminal stations STA 1, STA 2 and STA 3 perform communication operation under control of the AP, and it is assumed that each STA has an uplink MU function.

In the case where the AP acquires a channel access right, the AP transmits the first trigger frame which allows transmission to the STA 1 and the STA 2. In this event, in the case where it is expected that the AP further performs reception from the STA through UL MU, the AP describes Trigger CW parameter or Backoff Parameter within a Control Parameter field within the trigger frame to notify each subordinate STA of a waiting period (CW_AP_1) until the AP itself transmits the next trigger frame after the first UL MU communication.

Further, the AP can control the CW value in the case where the STA which receives the trigger frame performs retransmission by describing a CW setting value only for the STA which performs retransmission in Retry Parameter within the Control Parameter field within the trigger frame.

The STA 1 and the STA 2 start transmission of the first uplink data frames (UL MU PPDU) at the same time and complete the transmission at the same time in accordance with an instruction of the first trigger frame. In this event, while the AP successfully receives the data frame from the STA 1, the AP fails in reception of the data frame from the STA 2. Therefore, the AP encourages the STA 2 to retransmit the data by excluding BA addressed to the STA 2 in M-BA which makes a notification of the reception result.

After the first UL MU transmission is finished, the AP starts back off to further perform reception from the STA through the second UL MU. Further, the STA 2 starts back off to retransmit the data frame which has failed to be received at the AP.

In this event, the STA 2 sets the CW value of the STA 2 greater than the CW value of the AP (CW_AP_1) notified through Trigger CW Parameter or Backoff Parameter within the first trigger frame at the discretion of the STA 2 itself. Therefore, the AP can preferentially acquire a channel access right, and the AP continuously transmits the second trigger frame.

Alternatively, in the case where the CW value only for retransmission is described in the Retry Parameter field of the first trigger frame, the STA 2 sets a transmission waiting period based on this CW value and starts back off for retransmission of the data frame which has failed to be received at the AP in the first UL MU transmission. In the case where it is expected that UL MU transmission is continuously performed, the AP describes a CW value greater than the CW value (CW_AP_1) set for the AP in the Retry Parameter field. Therefore, if the STA 2 sets the transmission waiting period for data retransmission in accordance with description in the Retry Parameter field, the AP can preferentially acquire a channel access right, and continuously transmits the second trigger frame.

Note that the AP can determine a CW setting value only for retransmission in accordance with the AC level. For example, in the first trigger frame, the AC level with higher priority is described, and a smaller CW value is described in Retry Paremeter as priority is higher, while, in the second trigger frame, an AC level with lower priority is described, and a greater CW value is described in Retry Paremeter as priority is lower. By this means, the STA 2 which performs retransmission of data which has failed to be received at the AP in the first UL MU transmission can retransmit the data with a higher AC level first by a shorter transmission waiting period being set for the STA 2 than the STA which has failed in the second UL MU transmission.

Referring to FIG. 14 again, description will be continued. While the AP allows uplink data transmission to the STA 1 and the STA 3 in the second trigger frame, the AP does not allow data transmission to the STA 2.

The STA 1 and the STA 3 start transmission of the second uplink data frames (UL MU PPDU) at the same time and complete the transmission at the same time in accordance with an instruction of the second trigger frame. In this event, the AP successfully receives the data frames from the STA 1 and the STA 3, and transmits M-BA which makes a notification of reception results to the STA 1 and the STA 3. Meanwhile, the STA 2 cannot retransmit the data which has failed to be received at the AP, through the second UL MU.

After the second UL MU transmission is finished, because the STA 2 has a schedule of retransmitting the data to the AP, the STA 2 restarts back off. Here, because the STA 2 restarts back off with the remaining value of CW without resetting the CW setting value upon returning to the SU mode, the STA 2 can acquire a channel access right immediately, so that the STA 2 can easily perform data retransmission. Then, if the AP successfully receives the data frame (UL SU PPDU) from the STA 2, the AP transmits S-BA which makes a notification of a reception result to the STA 2.

Note that this method can be also realized by the AP informing inside the BSS of the values of the CW and the BO in the case where the AP transmits the next trigger frame by describing the values in a beacon frame instead of in the trigger frame.

The following effects can be expected by the technology disclosed in the present specification being applied to the wireless LAN system supporting the MU mode.
(1) It is possible to prevent collision immediately after the MU mode is finished by channel access operation of each STA after the MU mode is finished being controlled through the trigger frame to be transmitted from the AP.
(2) As a result of the CW in the case where the AP transmits the trigger frame being set smaller than the CW of the STA or by the CW of the STA after the MU mode is finished being set greater, it is possible to cause communication in the MU mode to be preferentially performed than in the SU mode by enabling the trigger frame to be preferentially transmitted from the AP.
(3) Because the CW of each STA is not reset in the case where the mode is switched from the MU mode to the SU mode, the STA can shorten a waiting period until transmission since the MU mode has been finished, so that communication efficiency is improved.
(4) By the CW being set in accordance with priority of the STA, it is possible to improve overall efficiency of the system.

INDUSTRIAL APPLICABILITY

The technology disclosed in the present specification has been described in detail above with reference to the specific embodiment. However, it will be obvious to those skilled in the art that modification and replacement of the embodiment can be made without departing from the scope of the technology disclosed in the present specification.

While, in the present specification, the embodiment to which the technology disclosed in the present specification is applied to a wireless LAN network to which IEEE 802.11ax standards are applied has been mainly described, gist of the technology disclosed in the present specification is not limited to this. The technology disclosed in the present specification can be also applied in a similar manner to various communication systems in which uplink multi user transmission is performed or one or more terminals operate under the control of an access point.

In short, the technology disclosed in the present specification has been described in an illustrative form, and the description of the present specification should not be interpreted in a limited manner. The claims should be taken into account to judge the gist of the technology disclosed in the present specification.

Additionally, the present technology may also be configured as below.

(1)

A communication apparatus that transmits a frame in which information regarding a transmission waiting period of another terminal is described.

(2)

The communication apparatus according to (1),
in which the communication apparatus operates as an access point, and describes in the frame which notifies a subordinate terminal of allowance of multi user transmission, the information designating a transmission waiting period of the terminal after the multi user transmission is finished.

(3)

The communication apparatus according to (2),
in which the communication apparatus transmits the frame in which the information designating to each terminal a transmission waiting period longer than a transmission waiting period in a case where the communication apparatus performs multi user transmission after the multi user transmission is finished, is described.

(4)

The communication apparatus according to any of (2) or (3),
in which the communication apparatus transmits the frame in which the information designating a transmission waiting period different for each terminal is described.

(5)

The communication apparatus according to any of (2) to (4),
in which the communication apparatus transmits the frame in which the information designating a transmission waiting period in accordance with the number of times of transmission of the terminal is described.

(6)

The communication apparatus according to (5),
in which the communication apparatus transmits the frame in which the information designating a transmission waiting period such that a terminal whose number of times of transmission is smaller has a shorter transmission waiting period than a terminal whose number of times of transmission is larger, is described.

(7)

The communication apparatus according to (5),
in which the communication apparatus transmits the frame in which the information designating a shorter transmission waiting period for a terminal which performs data retransmission than a transmission waiting period of another terminal, is described.

(8)

The communication apparatus according to any of (2) to (7),
in which the communication apparatus transmits the frame in which the information designating a longer transmission waiting period for the terminal which is allowed to perform multi user transmission, than a remaining transmission waiting period of a terminal which performs data retransmission, is described.

(9)

The communication apparatus according to any of (2) to (8),
in which the communication apparatus transmits the frame in which a category favorable for the multi user transmission and the information designating a transmission waiting period for the terminal after the multi user transmission is finished, are described.

(10)

The communication apparatus according to (9),
in which the communication apparatus transmits the frame in which the information designating a transmission waiting period for the terminal in accordance with the category is described.

(11)

The communication apparatus according to any of (9) or (10),
in which, in the frame in which a category with higher priority is designated, the information designating a transmission waiting period shorter than a remaining period of a transmission waiting period set in a case where a category with lower priority is designated, is described.

(12)

A communication method including:
a step of transmitting a frame in which information regarding a transmission waiting period of another terminal is described.

(13)

A communication apparatus that sets, on the basis of information regarding a transmission waiting period of the communication apparatus described in a received frame, a transmission waiting period after communication processing relating to the received frame is performed.

(14)

A communication apparatus that transmits a frame in which information regarding a transmission waiting period of the communication apparatus upon next frame transmission is described.

(15)

The communication apparatus according to (14),
in which the communication apparatus operates as an access point, and describes the information regarding the transmission waiting period of the communication apparatus upon the next frame transmission in the frame which notifies a subordinate terminal of allowance of multi user transmission.

(16)

The communication apparatus according to (15),
in which the communication apparatus describes a predetermined value as the information in a case where a next frame is not transmitted for a while after the frame is transmitted.

(17)

The communication apparatus according to any of (15) or (16),
in which the communication apparatus further describes in the frame, information regarding a transmission waiting period upon retransmission of a frame transmitted by the terminal through the multi user transmission.

(18)

The communication apparatus according to (17),
in which the communication apparatus transmits the frame in which a category favorable for multi user transmission and the information regarding a transmission waiting period upon retransmission in accordance with the category are described.

(19)

A communication method including:
a step of transmitting a frame in which information regarding a transmission waiting period of an own communication apparatus upon next frame transmission is described.

(20)

A communication apparatus that sets, on the basis of information regarding a transmission waiting period upon next frame transmission by a transmission source of a frame described in the received frame, a transmission waiting period of the communication apparatus after communication processing relating to the received frame is performed.

REFERENCE SIGNS LIST 500 communication apparatus
501 data processing unit
502 control unit
503 communication unit
504 power supply unit
511 modulating/demodulating unit
512 spatial signal processing unit
513 channel estimating unit
514 wireless interface unit
515 amplifier unit
516 antenna

The invention claimed is:

1. An access point apparatus comprising:
communication circuitry including wireless interface circuitry, amplifier circuitry, and an antenna;
control circuitry; and
a power supply which supplies power to the wireless interface circuitry, the amplifier circuitry, and the control circuitry,
wherein the control circuitry is configured to
control to transmit, using the communication circuitry, a frame in which information of a category favorable for uplink multi user transmission and information regarding a transmission waiting period of a communication apparatus after the uplink multi user transmission is finished are included, and
include, in the frame, the information regarding the transmission waiting period of the communication apparatus in accordance with the category,
wherein the information regarding the transmission waiting period includes information regarding a contention window,
wherein the category includes AC_VO (Voice), AC_VI (Video), AC_BE (Best Effort), or AC_BK (Background),
wherein the control circuitry is configured to include, in the frame, the information regarding the transmission waiting period longer than another transmission waiting period in a case where the access point apparatus performs another uplink multi user transmission after the uplink multi user transmission is finished, and wherein the control circuitry is configured to acquire, based on back off, an opportunity to trigger the uplink multi user transmission, and acquire, based on the another transmission waiting period, another opportunity to trigger the another uplink multi user transmission.

2. The access point apparatus according to claim 1,
wherein the control circuitry is configured to control to transmit the frame including the information designating a transmission waiting period which is different for each communication apparatus.

3. The access point apparatus according to claim 1,
wherein the control circuitry is configured to control to transmit the frame including the information designating the transmission waiting period in accordance with a number of times of transmission of the communication apparatus.

4. The access point apparatus according to claim 3,
wherein the control circuitry is configured to control to transmit the frame including the information designating the transmission waiting period such that a communication apparatus whose number of times of transmission is smaller has a shorter transmission waiting period than a communication apparatus whose number of times of transmission is larger.

5. The access point apparatus according to claim 3,
wherein the control circuitry is configured to control to transmit the frame including the information designating a shorter transmission waiting period for a communication apparatus which performs data retransmission than a transmission waiting period of another communication apparatus.

6. The access point apparatus according to claim 1,
wherein, in the frame in which a category with higher priority is designated, the information designating a transmission waiting period shorter than a remaining period of a transmission waiting period set in a case where a category with lower priority is designated, is included.

7. A communication apparatus comprising:
communication circuitry including wireless interface circuitry, amplifier circuitry, and an antenna;
control circuitry; and
a power supply which supplies power to the wireless interface circuitry, the amplifier circuitry, and the control circuitry,
wherein the control circuitry is configured to
set, on a basis of information regarding a transmission waiting period of the communication apparatus included in a frame received from an access point apparatus, a transmission waiting period after uplink multi user transmission is finished, the frame including information of a category favorable for the uplink multi user transmission and the information regarding the transmission waiting period of the communication apparatus in accordance with the category,
control to perform, using the communication circuitry, the uplink multi user transmission triggered by the access point apparatus based on back off, and
control to further perform, using the communication circuitry, another uplink multi user transmission triggered by the access point apparatus based on another transmission waiting period,
wherein the information regarding the transmission waiting period includes information regarding a contention window,
wherein the category includes AC_VO (Voice), AC_VI (Video), AC_BE (Best Effort), or AC_BK (Background), and
wherein the transmission waiting period is longer than the another transmission waiting period in a case where the another uplink multi user transmission is performed after the uplink multiuser transmission is finished.

8. The communication apparatus according to claim 7,
wherein the control circuitry is configured to control to receive, using the communication circuitry, the frame including the information designating a transmission waiting period which is different for each communication apparatus.

9. The communication apparatus according to claim 7,
wherein the control circuitry is configured to control to receive, using the communication circuitry, the frame including the information designating the transmission waiting period in accordance with a number of times of transmission of the communication apparatus.

10. The communication apparatus according to claim 9,
wherein the control circuitry is configured to control to receive the frame including the information designating the transmission waiting period such that a communication apparatus whose number of times of transmission is smaller has a shorter transmission waiting period than a communication apparatus whose number of times of transmission is larger.

11. The communication apparatus according to claim 9,
wherein the control circuitry is configured to control to receive the frame including the information designating a shorter transmission waiting period for a communication apparatus which performs data retransmission than a transmission waiting period of another communication apparatus.

12. The communication apparatus according to claim 7,
wherein, in the frame in which a category with higher priority is designated, the information designating a transmission waiting period shorter than a remaining period of a transmission waiting period set in a case where a category with lower priority is designated, is included.

* * * * *